United States Patent [19]
Tsuji et al.

[11] Patent Number: 6,047,315
[45] Date of Patent: *Apr. 4, 2000

[54] SYSTEM FOR TASK TRACKING AND CONTROLLING ELECTRONIC MAIL

[75] Inventors: Hiroshi Tsuji, Itami; Yoji Taniguchi, Ikeda; Hirohide Haga, Kyoto; Satoshi Wakayama, Sakai; Michiko Oba, Ikeda; Toyozo Aoyama, Osaka; Shoichi Masui, Kawasaki, all of Japan

[73] Assignee: Hitachi, Ltd., Tokyo, Japan

[*] Notice: This patent is subject to a terminal disclaimer.

[21] Appl. No.: 09/065,462

[22] Filed: Apr. 24, 1998

Related U.S. Application Data

[62] Division of application No. 07/937,748, Sep. 1, 1992, Pat. No. 5,764,898.

[30] Foreign Application Priority Data

Sep. 3, 1991 [JP] Japan ................................ 3-222693

[51] Int. Cl.⁷ ...................................................... G06F 13/00
[52] U.S. Cl. ......................... 709/206; 709/205; 709/200; 709/224
[58] Field of Search .................................. 709/206, 205, 709/200, 224

[56] References Cited

U.S. PATENT DOCUMENTS

| | | |
|---|---|---|
| 4,918,588 | 4/1990 | Barret et al. . |
| 5,033,804 | 7/1991 | Faris . |
| 5,063,523 | 11/1991 | Vrenjak . |
| 5,125,075 | 6/1992 | Goodale et al. . |
| 5,165,012 | 11/1992 | Cranda, II et al. . |
| 5,220,657 | 6/1993 | Bly et al. . |
| 5,245,532 | 9/1993 | Mourier . |
| 5,247,591 | 9/1993 | Baran . |
| 5,276,869 | 1/1994 | Forrest et al. . |
| 5,283,665 | 2/1994 | Ogata . |
| 5,285,203 | 2/1994 | Nakano . |
| 5,293,250 | 3/1994 | Okumura et al. . |
| 5,325,310 | 6/1994 | Johnson et al. . |
| 5,333,272 | 7/1994 | Capek et al. . |
| 5,337,310 | 8/1994 | Fisher . |
| 5,349,662 | 9/1994 | Johnson et al. . |
| 5,461,488 | 10/1995 | Witek . |

FOREIGN PATENT DOCUMENTS

| | | |
|---|---|---|
| 371605 | 6/1990 | European Pat. Off. . |
| 60-134371 | 7/1985 | Japan . |

OTHER PUBLICATIONS

Journal of Information Processing, vol. 12, No. 1, 1988, pp. 9–15.
OFIS/MAIL–EV (Manual No. 2050–3–1061). Hitachi, Ltd. 1987–1988.
"A Spreadsheet for Cooperative Work", Kum–Yow Kai et al. CSCW '88, Sep. 1988, pp. 115–124.
"A Language/Action Perspective on the Design of Cooperative Work", Winograd et al, 1988, p. 623.

*Primary Examiner*—Ahmad F. Matar
*Assistant Examiner*—Philip B. Tran
*Attorney, Agent, or Firm*—Beall Law Offices

[57] ABSTRACT

An office information system having a plurality of work stations connected via a network to mutually exchange electronic mails each includes a control information definition unit for defining control information representing what kind of processing can be performed on mails after reception, a processing log memory unit for storing log information of operations which have been performed on a received mail, a control unit for guiding a receiver by referring to both the control information and log information, a task tracking instruction unit for inquiring the processing status of mail, and a task tracking unit for reporting the status in response to such a tracking instruction. The system stores and interprets control information relating to the flow of an OA object on the network, which has been conventionally involved in the memory of an office worker, and guides the office worker to work to be done by the office worker. As a result, a chance for the OA object to stagnate at a certain location is reduced, and the circulation of OA objects on the network is totally improved.

17 Claims, 10 Drawing Sheets

SYSTEM FOR TASK TRACKING AND CONTROLLING ELECTRONIC MAIL

This is a divisional application of U.S. Ser. No. 07/937,748, filed Sep. 1, 1992 U.S. Pat. No. 5,764,898.

BACKGROUND OF THE INVENTION

The present invention generally relates to an office information system, and in particular to an office information system suitable for visualization and control of information circulation when office workers mutually exchange electronic mail messages by using a decentralized information system having a plurality of work stations connected via a network.

As cost and weight of personal computers and word processors are reduced, a large number of office workers have come to edit documents and spread sheets (hereafter collectively referred to as office automation (OA) objects) by using computers. Heretofore, software systems for processing these office automation (OA) objects have provided functions of aiding personal work in a closed system. However, it is hard to say that software systems have supported cooperative work by a plurality of workers as a group or groups.

Electronic mail services are included in the rudiments of cooperative work. As for the electronic mail, OFIS/MAIL-EV (manual No. 2050-3-061) of Hitachi, Ltd. and techniques which will be described later are known. They have functions such as carbon copy mail, express mail and confidential mail. In addition, they have a function of mailing to a remote location via a plurality of computers. These electronic mailing systems have automated conventional postal service of offices and achieved speeding-up of information exchange.

In JP-A-60-134371 of the present inventors, there is disclosed an information storage and utilization method of storing procedure information relating to event-driven processing procedures, retrieving the above-described procedure information upon occurrence of a certain event, and automatically executing the procedure in an event-driven manner in accordance with pertinent procedure information if the pertinent procedure information is present. A typical example of events is "mail reception", and a receiving person can define what should be done for the received mail. However, control exercised over mail by a sending person is not considered at all. A conventional technique similar to this is described in "A 'Spreadsheet' for Cooperative Work" by Kum-Yew Lai et al., CSCW '88, pp. 115–124 (September 1988).

In "A Language/Action Perspective on the Design of Cooperative Work" by Terry Winograd, Morgan Kaufmann Publisher, Inc., 1988, a technique of modeling a state transition for conversation is disclosed. The modeling technique involves registration means for registering a conversation structure model including request, proposal, counterproposal, promise, and disapproval defined beforehand by a system designer and means for tracking the circulation of "conversation" by using the conversation structure model. A user is thus reminded of pending matters.

The above-described thesis makes no mention of definition of control over mail given by a sender.

In conventional electronic mail systems as exemplified above, all control determining "until when and what should be done for received mail" was basically left to the receiving person as represented by the expression "determined by receiving person after being received". Further, the sender could know "whether mail had arrived or not" and "whether the mail had been read or not". However, the sender could not know "how the mail had been processed" and "why the mail had not been processed", which were truly desired to be known, via the system. Further, the sender could not modify mail once transmitted by means of the sender's own operation. From the point of view of a receiver, the receiver must monitor reception for himself when there is mail to be necessarily received.

Conventional mail is effectively used in one way message passing. However, the functional limitation heretofore described brings about a problem of the conventional mail that OA objects mailed to request receiving persons to take action often are left unprocessed. This functional limitation is basically caused by the fact that conventional mail systems are designed by faithfully modeling the postal service of offices.

That is to say, in conventional electronic mail systems, consideration is not fully given to system support relating to visualization and control of flow of OA objects needed when a plurality of office workers cooperate with each other asynchronously, which is a feature of office work.

SUMMARY OF THE INVENTION

An object of the present invention is to provide an office information system eliminating the above-described problem of the conventional technique in which a circulation state such as stagnation of mailed information is difficult to see and control is left in the hands of a user, by improving the circulation of OA objects on a network, i.e., by aiding asynchronous business transactions included in cooperative office work.

In order to achieve the above-described object, an office information system according to one feature of the present invention includes a plurality of processing stations connected via a network, each station including means for defining control information with respect to an OA object circulating through the network, control means for interpreting the defined control information to execute relevant control, means for storing a log or record of processing applied to the OA object (hereafter referred to as processing log memory means), means for inquiring of another station the state of the OA object (hereafter referred to as task tracking instruction means), and means for answering an inquiry from another station (hereafter referred to as task tracking means). Further, these means can include the following functional aspects.

For one aspect, the control information definition means is provided with a function of "allowing a sender to define what kind of processing a receiver can conduct with respect to mail", and the processing log memory means is provided with a function of storing "information as to what the receiver has done with respect to received mail or whether the receiver has done something with respect to the received mail," whereas the control means is provided with a function of "guiding the receiver as to what the receiver should do by referring to both of these information pieces".

In order to highly advance the flow control of OA objects, information representing "the deadline for processing and conditions of processing" is included in control information defined by the sender. On the other hand, the above-described control means is provided with a function of prompting the receiver to process the received mail when a fixed time interval before the above-described deadline is reached or that deadline is exceeded, a function of causing a report to inform the sender that the transmitted mail is not processed, or a function of causing a report to inform the sender or the receiver of unsatisfied conditions in processing.

From another point of view, these functions include allowing the sender to track the mail once transmitted. That is to say, the above-described task tracking instruction means is provided with a function of "making inquiries about the processing status" and "changing control information once defined", and the task tracking means is provided with a function of answering such inquiries. The control information definition means is provided with a function of "allowing not only the sender but also the receiver to change control information once defined".

Further, the control information definition means is provided with a function of defining "information relating to schedule of reception of mail by the expected receiver or information relating to the day's schedule under which the expected receiver will be absent and cannot access the system".

According to the present invention, the system itself stores and interprets control information relating to the flow of an OA object on the network, which has been conventionally involved in the memory of an office worker, and guides the office worker to work to be done by the office worker. Therefore, the chance that the OA object will stagnate at a certain location is reduced, resulting in improved circulation of OA objects on the network.

DESCRIPTION OF THE PREFERRED EMBODIMENTS

Figure 2:
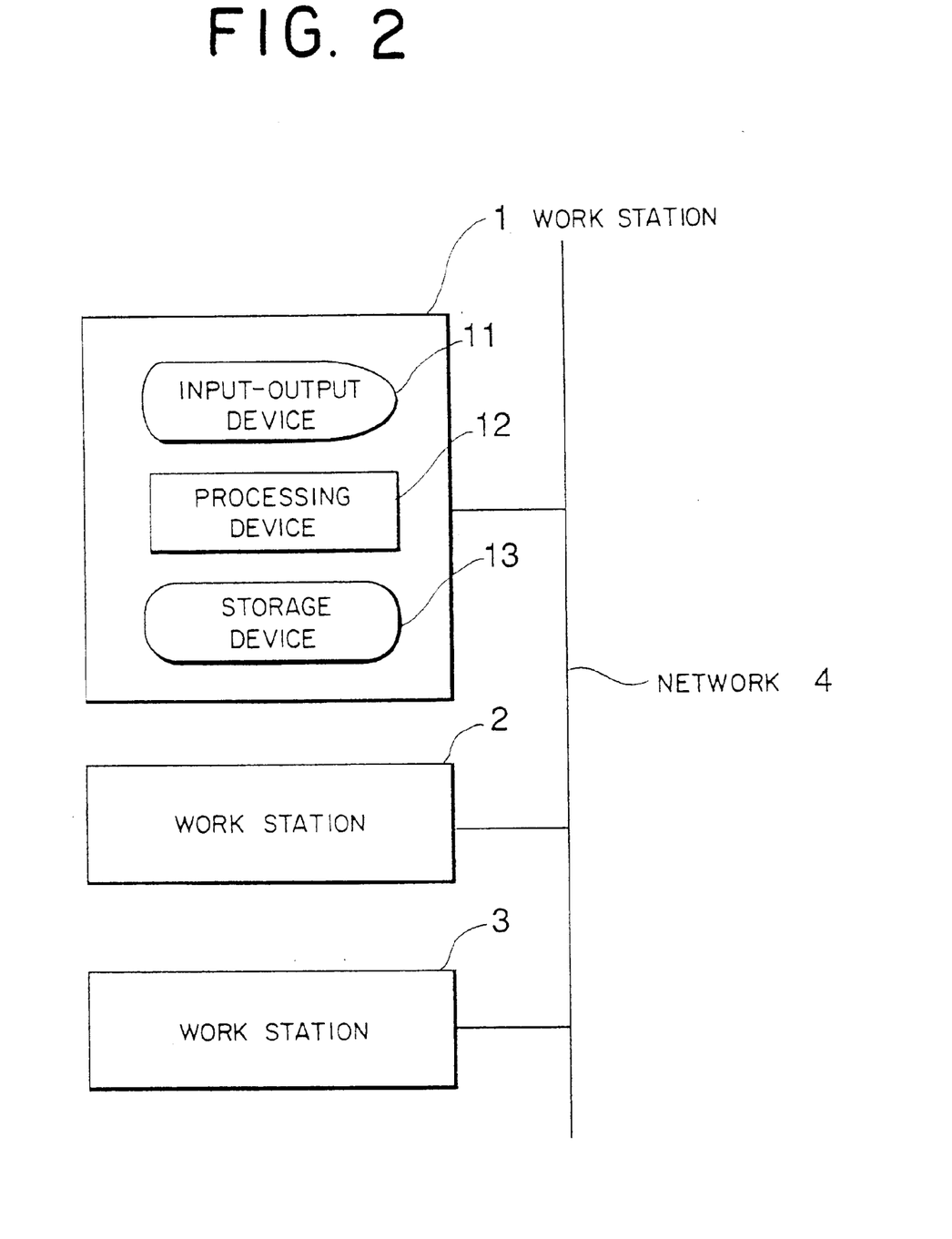
FIG. 2 is a block circuit diagram showing an example of a hardware configuration for implementing the present invention.

An embodiment of the present invention is implemented by a hardware configuration having a plurality of work stations 1, 2, 3, . . . connected via a network 4 as shown in FIG. 2. The work station 1 includes an input/output device 11, a processing device 12 and a memory device 13. Each of the other stations also includes similar devices.

Figure 1:
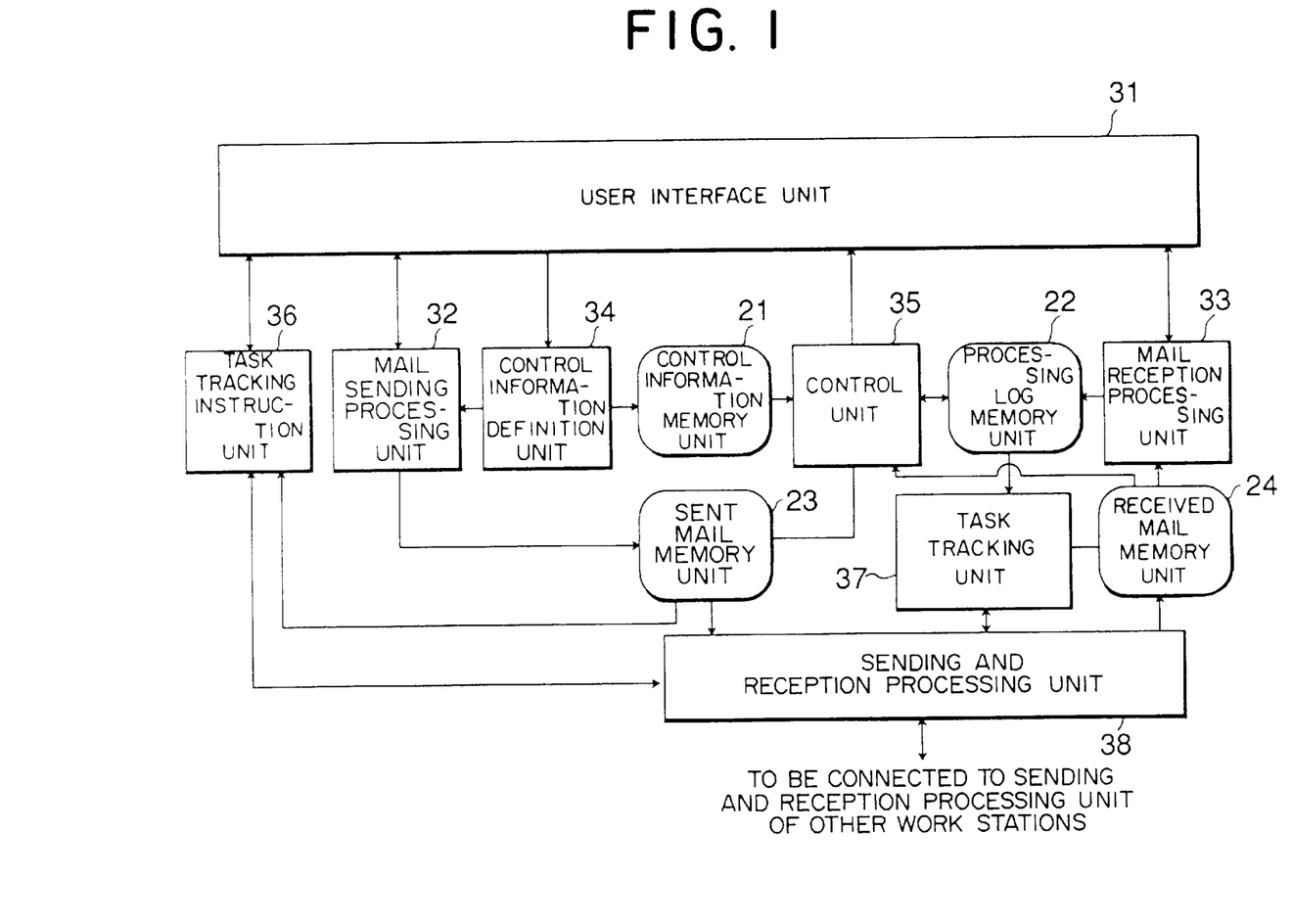
FIG. 1 is a block diagram showing an example of functional blocks for implementing the present invention.

A configuration of functional blocks implementing the present embodiment will now be described by referring to FIG. 1.

Each work station in the present embodiment can be implemented by functional blocks including four memory units: a control information memory unit 21, a processing log memory unit 22, a sent mail memory unit 23, and a received mail memory unit 24. Further, each work station includes eight processing units (modules): a user interface unit (module) 31, a mail sending processing unit (module) 32, a mail reception processing unit (module) 33, a control information definition unit (module) 34, a control unit (module) 35, a task tracking instruction unit (module) 36, a task tracking unit (module) 37, and a sending and reception processing unit (module) 38.

The user interface unit 31 governs the interface between the user and various functions provided by the present system. The control information definition unit 34 implements the function of defining control information relating to flow of an OA object on the network. Out of information defined by the control information definition unit 34, control information for the mail to be sent is delivered to the mail sending processing unit. 32, and added there to the mail text. Control information for the received mail is stored in the control information memory unit 21 and referred to by the control section 35.

In addition to governing editing of the mail text to be sent, the mail sending processing unit 32 derives control information from the control information definition unit 34 and stores it into the transmitted mail memory unit 23. The mail stored in the transmitted mail memory unit 23 is sent to another work station having an address specified by the sending and reception processing unit 38 via the network.

The sending and reception processing unit 38 receives mail sent from another work station, and stores it in the received mail memory unit 24. When the mail reception processing unit 33 has conducted processing for the mail stored in the received mail memory unit 24, the mail reception processing unit 33 stores its processing log in the processing log memory unit 22.

In order to guide, prompt, or warn users for coming operations with respect to the received mail, and to make a report to the sender of the mail, the control unit 35 stores messages in the sent mail memory unit 23 by referring to the information stored in the control information memory unit 21, the processing log memory unit 22, and the received mail memory unit 24.

The task tracking instruction unit 36 governs the interface so that the sender may give an instruction for following the mail status, refers to the information stored in the sent mail memory unit 23, and performs information exchange with the task tracking unit 37 of another work station.

The task tracking unit 37 is executed by the task tracking instruction unit 36. The task tracking unit 37 refers to the information stored in the received mail memory unit 24 and the processing log memory unit 22, changes the information stored in the received mail memory unit 24, and returns a proper answer to the task tracking instruction unit 36 of the other work station which has issued an inquiry or request via the sending and reception processing unit 38.

Operation of the system will now be described by using concrete examples of information shown in FIG. 3 and concrete examples of flow chart shown in FIG. 7.

Figure 3:
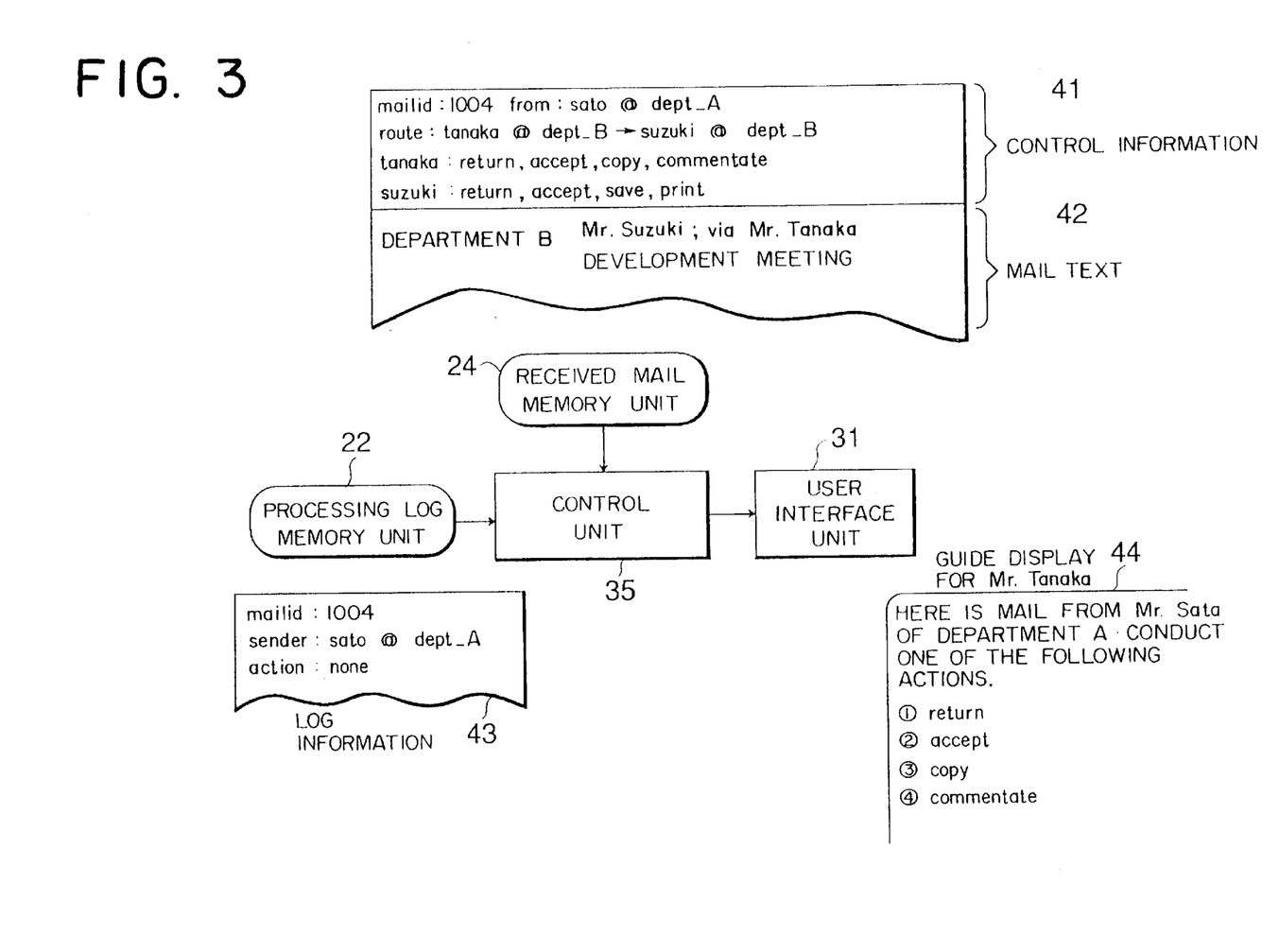
FIG. 3 is a diagram showing an example of guidance of a mail processing operation according to the present invention.

FIG. 3 shows an example in which the sender defines control information, adds it to a mail text 42, and sends the mail text 42 with the control information added thereto to guide the receiving person. FIG. 7 shows an example of an operation corresponding thereto. In this example, the control unit 35 refers to the control information 41 and log information 43, and exhibits a guide display 44 to prompt the receiver to processing (step 101 of FIG. 7). The control information 41 shows not only that the circulation route of the mail is from Mr. Tanaka to Mr. Suzuki, but also that Mr. Tanaka can perform "return", "accept", "copy", and "commentate" processing and Mr. Suzuki can perform "return", "accept", "save", and "print" processing. The processing log information 43 indicates that the mail is not yet processed. As a result, the control unit 35 prompts Mr. Tanaka to conduct "return", "accept", "copy", or "commentate" processing via the user interface unit 31 on the basis of the above-described information (step 105 of FIG. 7).

In components of FIG. 3, it is also possible that the control information 41 includes the deadline of processing. In this case, the control unit 35 can prompt the receiving person to conduct processing when a fixed time interval before the above-described deadline is reached or that deadline is exceeded (step 103 of FIG. 7). Further, the control information 41 can include the conditions under which the processing can be conducted. In this case, the control unit 35 monitors whether the conditions are satisfied or not (step 104 of FIG. 7). When the conditions are satisfied, the receiving person can be guided. The steps 103 and 104 in FIG. 7 are thus optional.

Figure 7:
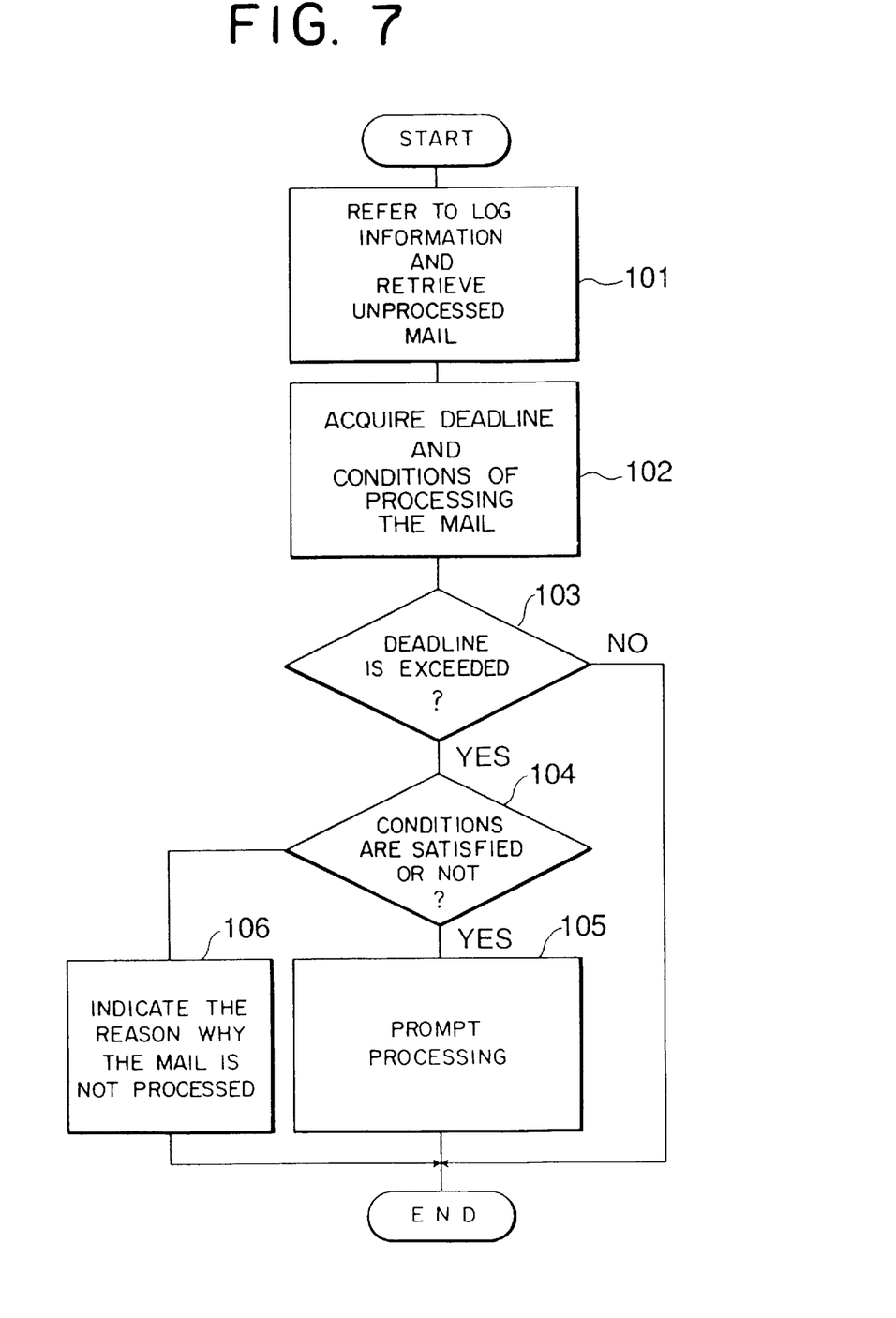
FIG. 7 is a flow chart showing an example of a deadline processing operation.

On the other hand, the control unit can search for unsatisfied conditions and indicate the unsatisfied conditions as the reason why the mail is not processed (step 106 of FIG. 7).

Figure 4:
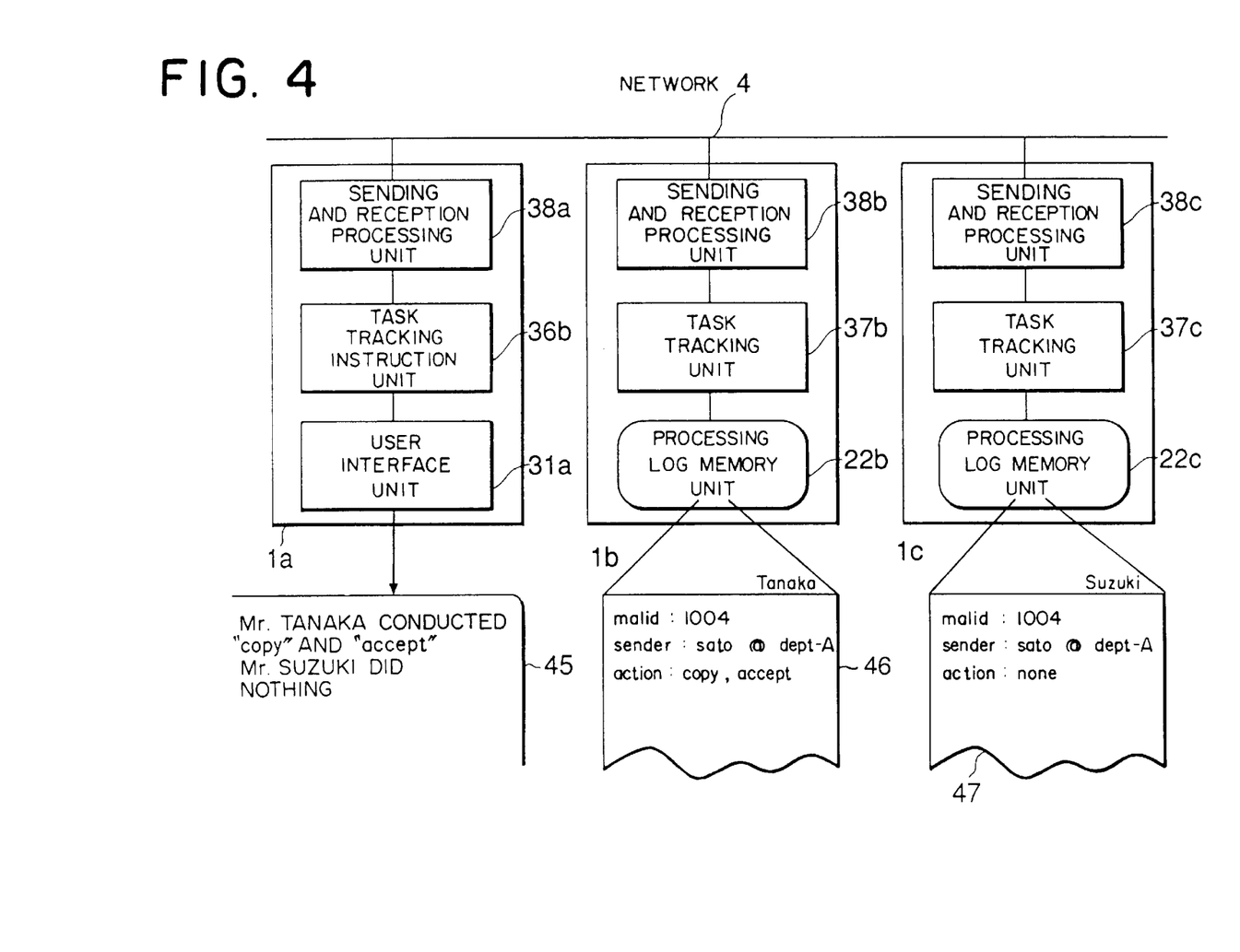
FIG. 4 is a diagram showing an example of tracking of processing status according to the present invention.
Figure 8:
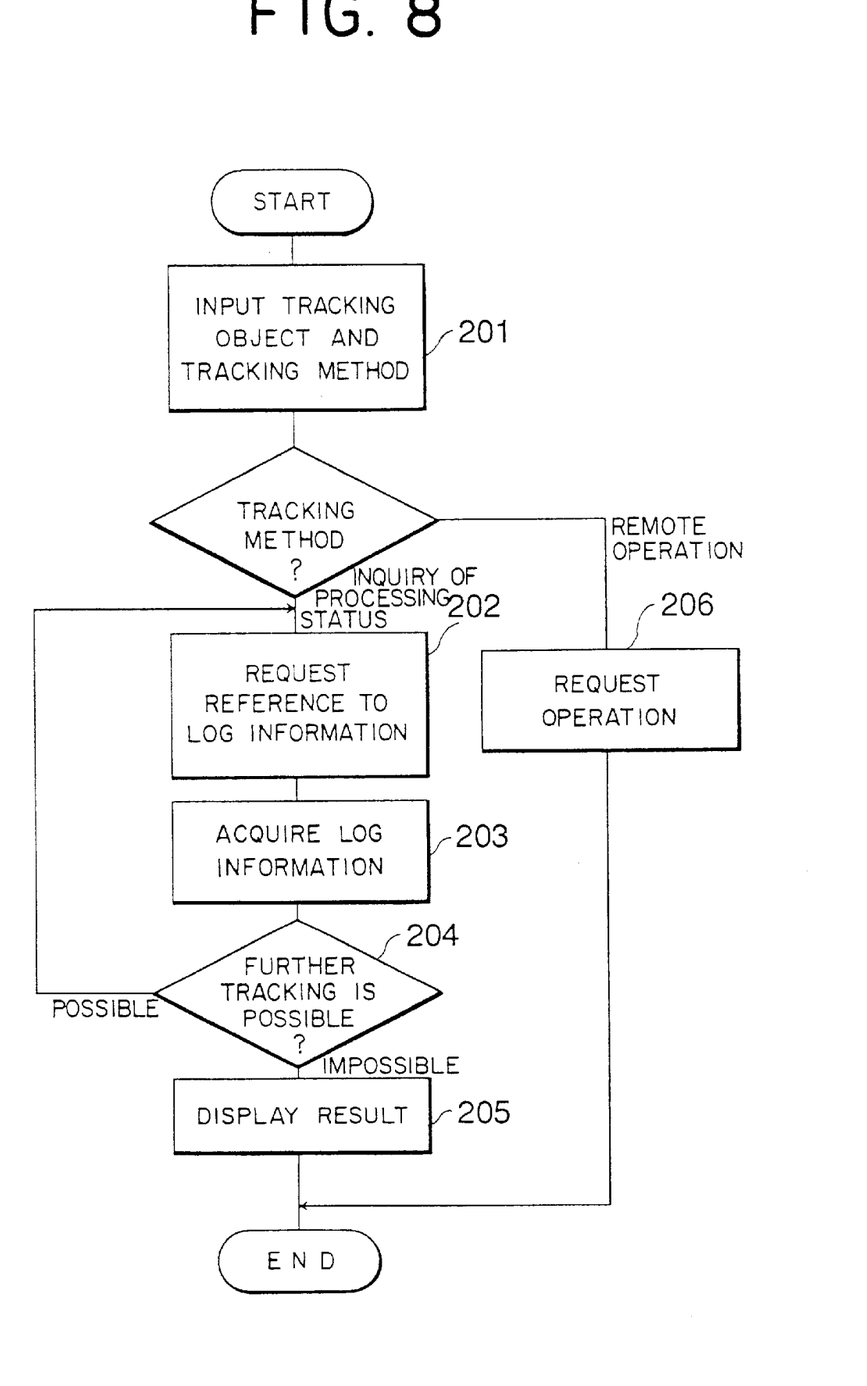
FIG. 8 is a flow chart showing an example of a task tracking operation.

FIG. 4 shows examples of respective components of the system involved when the processing status of a sent mail message is tracked. An example of an operation corresponding to FIG. 4 is shown in FIG. 8.

When the sender instructs the task tracking instruction unit 36*a* to report the status via its own user interface unit 31*a* (step 201 of FIG. 8), that instruction first makes the task tracking unit 37*b* of Mr. Tanaka's work station 1*b* refer to the processing log memory unit 22*b* (step 202 of FIG. 8). In this example, it is indicated by log information 46 of FIG. 4 that the "copy" and "accept" processing has been completed (step 203 of FIG. 8). Therefore, it is determined that further task tracking is necessary (step 204 of FIG. 8), and the system makes the task tracking unit 37*c* of Mr. Suzuki's work station 1*c* refer to the processing log memory unit 22*c* (step 202 of FIG. 8). In this example, it is found from log information 47 of FIG. 4 that nothing has been done (step 203 of FIG. 8). On the basis of these two log information pieces, the user interface unit 31*a* of the work station 1*a* shows to the sender a status report display 45 of FIG. 4 (step 205 of FIG. 8).

Figure 5:
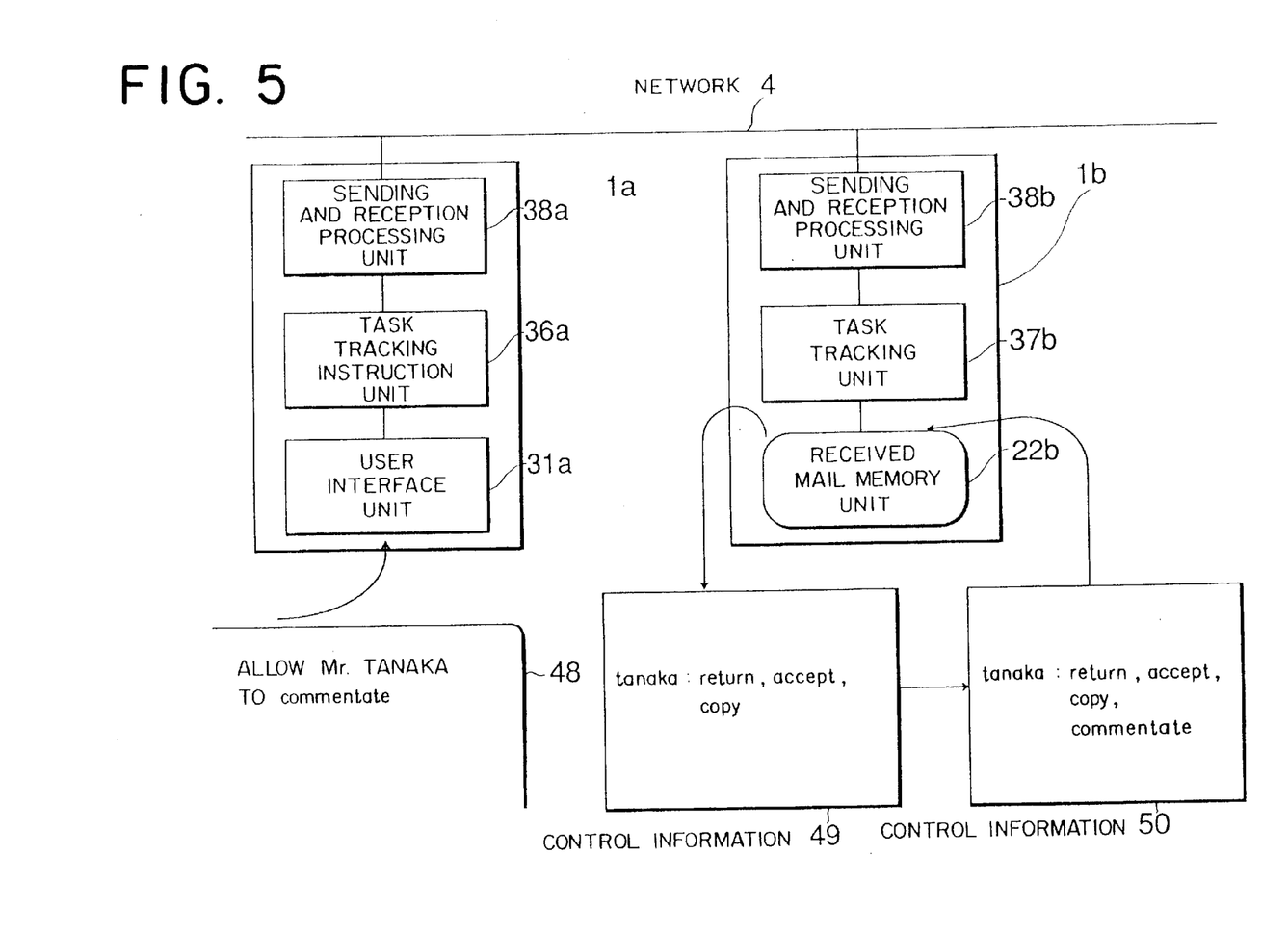
FIG. 5 is a diagram showing an example of remote operation of work stations.

FIG. 5 shows examples of respective components of the system involved when the control information of the sent mail is subjected to remote operation. This operation is also shown in FIG. 8. When the sender inputs a remote operation exemplified by a remote control display 48 (step 201 of FIG. 8), the task tracking instruction unit 36*a* starts the task tracking unit 37*b* of the work station 1*b* (step 206 of FIG. 8). The task tracking unit 37*b* changes control information 49 stored in the received mail memory unit 22*b* to control information 50. The control information 50 is stored in the received mail unit 22*b*.

Figure 6:
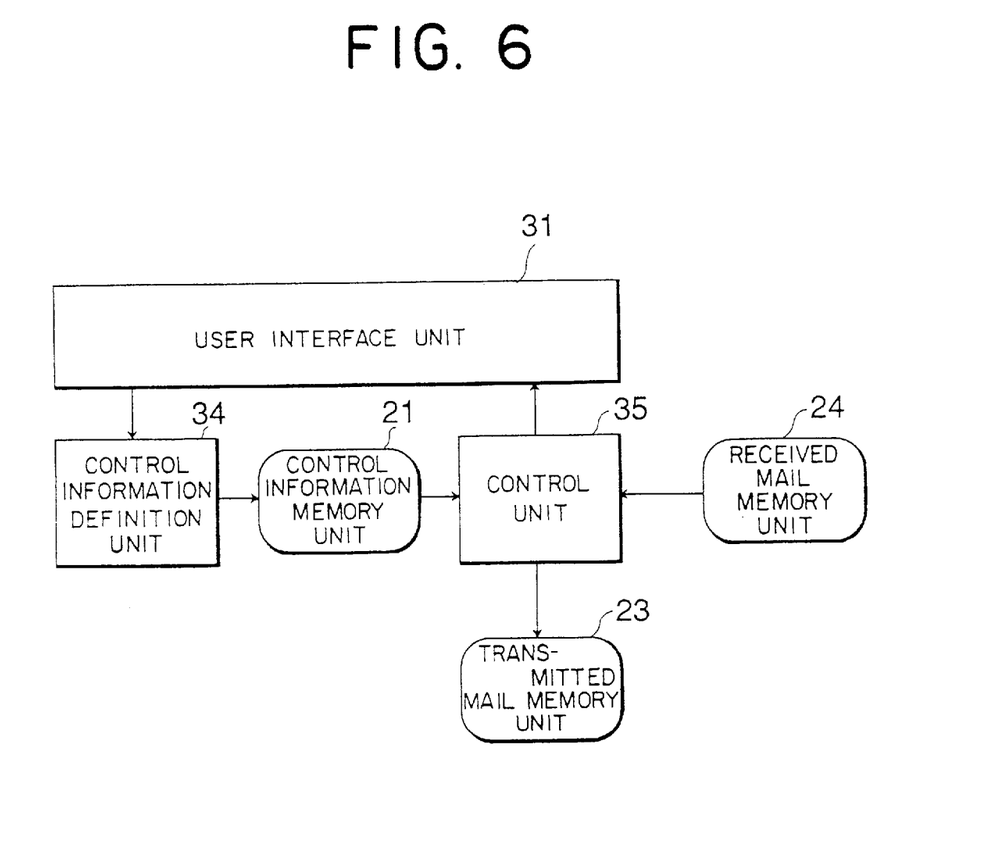
FIG. 6 is a block circuit diagram showing an example of control exercised over received mail.
Figure 9:
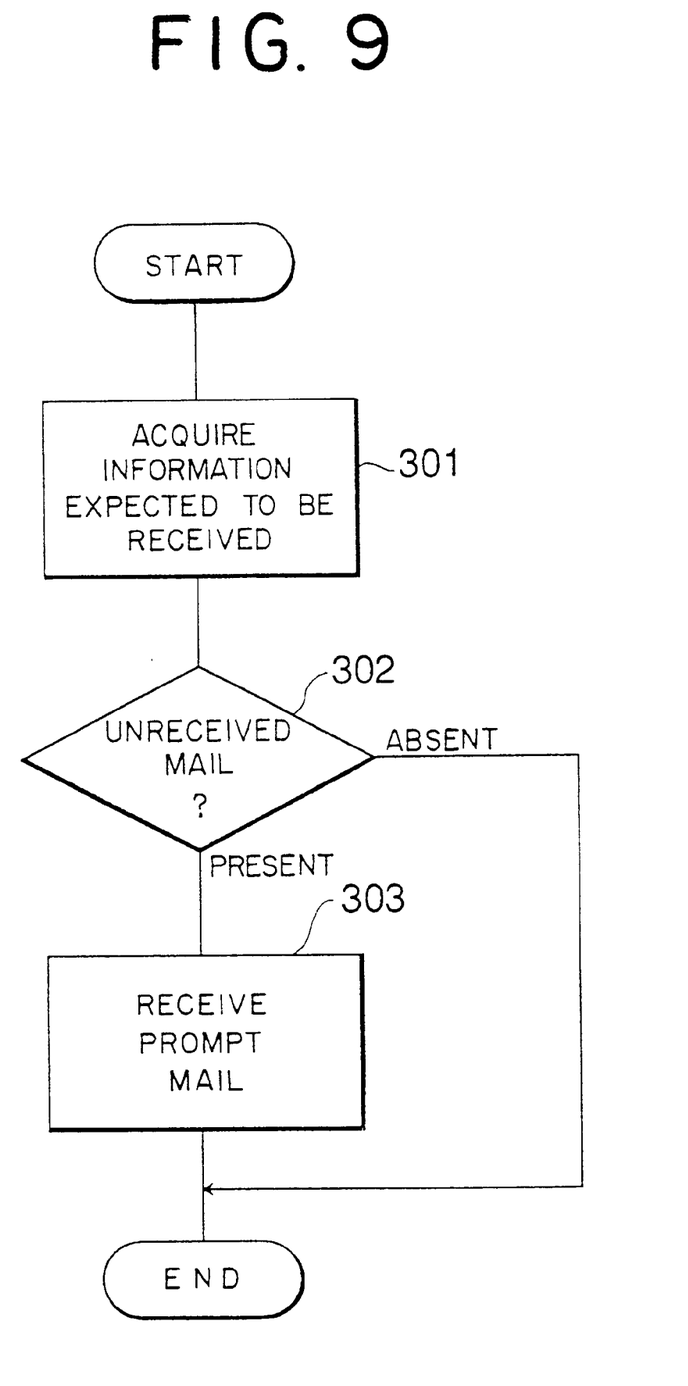
FIG. 9 is a flow chart showing an example of a processing operation for received mail.
Figure 10:
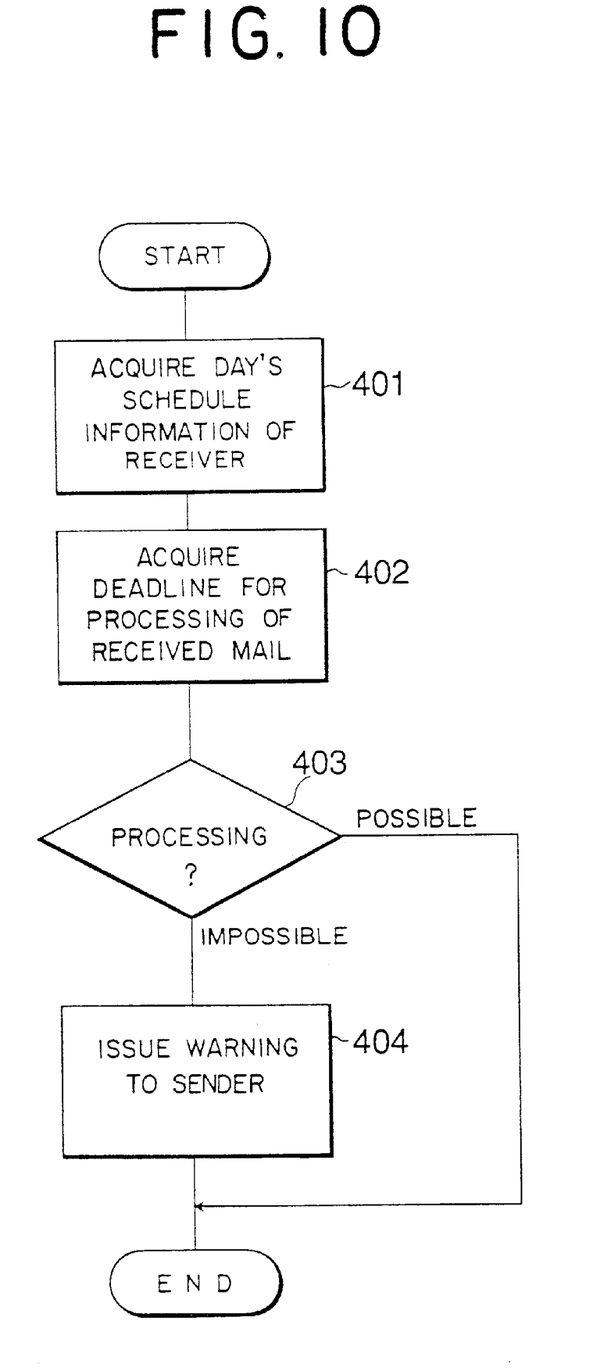
FIG. 10 is a flow chart showing another example of a processing operation for received mail.

FIG. 6 shows an example of control exercised over the received mail. Examples of operations corresponding to this control are shown in FIGS. 9 and 10. By using the control information definition unit 34, the receiving person stores beforehand mail scheduled to be received in the control information memory unit 21. The control unit 35 refers to that control information and the status in the received mail memory unit 24 (step 301 of FIG. 9). If there is mail which has not been received yet (step 302 of FIG. 9), a prompting message is issued to a scheduled sender (step 303 of FIG. 9). If it is defined beforehand as control information that a report should be made upon reception of mail, the control unit 35 makes a report via the user interface unit 31.

Referring to components shown in FIG. 6, if the schedule of the receiver (i.e., day's schedule under which the receiver cannot access the system) is stored in the control information memory unit 21 by using the control information definition unit 34, the control unit 35 refers to that information (step 401 of FIG. 10). If the day's schedule relating to the deadline is contained in the control information of the received mail, the control unit 35 refers to it (step 402 of FIG. 10) and compares them (step 403 of FIG. 10). If there is mail which cannot be processed, the control unit 35 issues a warning to let the sender know that the mail cannot be processed before the deadline (step 404 of FIG. 10). It will be understood that well-known techniques can be used for the above-described deadline control.

According to the present invention, the system stores and interprets control information relating to the flow of an OA object on the network, which has been conventionally involved in the memory of an office worker, and guides the office worker to work to be done by the office worker as heretofore described in detail. Therefore, the chance that the OA object will stagnate at a certain place is reduced, resulting in a significantly improved circulation of OA objects on the network.

We claim:

1. A first computer connected to a plurality of second computers via a network over which each second computer sends and receives electronic mail to and from another second computer, said first computer comprising:

definition means for defining control information, received from a sending second computer, specifying a mail route, at least one authorized user in each receiving second computer, and alternative actions for said electronic mail that are individually-determined and authorized to be conducted by each different authorized user in each receiving second computer;

sending means for attaching said control information to said electronic mail and for sending the control information-attached electronic mail via said mail route specified in said control information;

memory means for storing information of an operation log containing an action for the electronic mail conducted by the authorized user of each receiving second computer; and control means for referring to both the defined control information received from said sending second computer and said operation log information stored in said memory means, and for thereby guiding the authorized user of said receiving second computer as to a subsequent specific action to be conducted by the authorized user with respect to the received electronic mail.

2. A first computer connected to a plurality of second computers via a network over which each second computer sends and receives electronic mail to and from another second computer, said first computer comprising:

means for defining and holding control information, received from a sending second computer, specifying a mail route, at least one authorized user in each receiving second computer, and alternative actions for said electronic mail that are individually-determined and authorized to be conducted by each different authorized user in each receiving second computer;

means for storing information of an operation log containing an action for the electronic mail conducted by the authorized user of each receiving second computer:

task tracking instruction means for issuing a task tracking instruction to inquire into a routed electronic mail status of a receiving second computer; and task tracking means, responsive to reception of a task tracking instruction from an authorized user of a sending second computer, for reporting own electronic mail status.

3. A first computer according to claim 1, wherein:

said control information includes a deadline for the receiving second computer to process said electronic mail; and said control means includes means for prompting the receiving second computer to process received electronic mail, and for informing the receiving second computer that sent electronic mail is not yet processed, after a fixed time interval before said deadline has been reached.

4. A first computer according to claim 1, wherein:

said control information includes conditions allowing the receiving second computer to conduct a process; and said control means comprises means for monitoring whether the conditions are satisfied, and for guiding the receiving second computer to conduct the process when the conditions are satisfied.

5. A first computer according to claim 1, wherein:

said control information includes conditions allowing the receiving second computer to conduct a process; and said control means includes means for searching for unsatisfied conditions, and for indicating said unsatisfied conditions as a reason why electronic mail has not been processed by the receiving second computer.

6. A first computer according to claim 2, wherein:

said control information includes conditions allowing the receiving second computer to conduct a process;

said task tracking instruction means includes means for inquiring into why electronic mail has not been processed by the receiving second computer; and said task tracking means includes means for searching for unsatisfied conditions, and for indicating said unsatisfied conditions as a reason why electronic mail has not been processed by the receiving second computer.

7. A first computer according to claim 3, wherein:

said control information includes conditions allowing the receiving second computer to conduct a process, and a deadline for said process; and said control means includes means for monitoring whether said conditions are satisfied, and for informing a sending second computer or a receiving second computer of unsatisfied conditions obstructing the process, after a fixed time interval before said deadline has been reached.

8. A first computer according to claim 2, wherein:

said task tracking instruction means includes change instructing means for changing defined control information after sending of the electronic mail; and said task tracking means includes means for executing said instruction in conjunction with a control information change from said change instructing means.

9. A first computer according to claim 2, wherein said control information definition means includes means for changing the control information contained in received electronic mail.

10. A first computer connected to a plurality of second computers via a network over which each second computer sends and receives electronic mail to and from another second computer, said first computer comprising:

means for defining and storing control information specifying alternative actions for said electronic mail that are individually-determined and related to a schedule as to from whom, when, and what kind of electronic mail is expected to be received by a receiving second computer; and control means for automatically prompting, based on said control information, a scheduled sending second computer to send electronic mail which has not been received yet, and for informing a scheduled receiving second computer that electronic mail has not arrived yet.

11. A first computer according to claim 10, wherein said control means includes means for informing said scheduled receiving second computer of an event when specific electronic mail has been received by said first computer.

12. A first computer according to claim 3, further comprising:

means for defining a day's schedule under which an expected receiving second computer cannot access said first computer;

wherein said control means includes means for issuing a warning to let a sending second computer know that sent mail cannot be processed before the deadline if said day's schedule indicates that the mail cannot be processed prior to said deadline.

13. In a first computer connected to a plurality of second computers via a network over which each second computer sends and receives electronic mail to and from another second computer, a method executed in said first computer for processing electronic mail, comprising the steps of:

defining and holding control information, received from a sending second computer, specifying a mail route, at least one authorized user in each receiving second computer, and alternative actions for said electronic mail that are individually-determined and authorized to be conducted by each different authorized user in each receiving second computer;

attaching said control information to said electronic mail and sending the control information-attached electronic mail via said mail route specified in said control information;

storing information of an operation log containing an action for the electronic mail conducted by the authorized user of each receiving second computer; and guiding the authorized user of said receiving second computer as to a subsequent specific action to be conducted by the authorized user with respect to the received electronic mail based on both the defined control information received from a sending second computer and said operation log information.

14. A method according to claim 13, further comprising the step of inquiring into a receiving second computer of processing status of sent electronic mail in a broadcasting manner, and changing defined control information sent to another second computer.

15. A method according to claim 14, further comprising the step of informing a receiving second computer of processing status of electronic mail in response to an inquiry of said inquiring step.

16. A first computer connected to a plurality of second computers via a network over which each second computer sends and receives electronic mail to and from another second computer, said first computer comprising:

definition means for defining control information, received from a sending second computer, specifying an executable process;

sending means for sending the electronic mail attached with said control information based on said control information;

storing means for storing information of an operation log related to the electronic mail received by a receiving second computer; and control means for outputting guidance to said receiving second computer as to a subsequent specific action to be conducted by the receiving second computer pursuant to the received electronic mail based on said defined control information and said operation log information.

17. A first computer connected to a plurality of second computers via a network over which each second computer sends and receives electronic mail to and from another second computer, said first computer comprising:

definition means for defining control information, received from a sending second computer, specifying an executable process;

storing means for storing information of an operation log related to the electronic mail received by a receiving second computer; and task tracking means for reporting own electronic mail status by inquiring into a routed electronic mail status of a receiving second computer.

* * * * *